United States Patent [19]

Wempe et al.

[11] 4,313,591

[45] Feb. 2, 1982

[54] COMBINATION TOP OPERABLE AND BOTTOM OPERABLE TANK LADING VALVE ASSEMBLY

[75] Inventors: Richard J. Wempe; Gunter R. Behle, both of St. Charles, Mo.

[73] Assignee: ACF Industries, Incorporated, New York, N.Y.

[21] Appl. No.: 908,184

[22] Filed: May 22, 1978

[51] Int. Cl.³ .............................................. F16K 31/44
[52] U.S. Cl. .................................... 251/144; 251/289; 251/291
[58] Field of Search ............... 251/144, 289, 291, 292; 137/347, 350

[56] References Cited

U.S. PATENT DOCUMENTS

| | | | |
|---|---|---|---|
| 1,204,176 | 11/1916 | Mitchell | 251/289 |
| 1,473,474 | 11/1923 | Drake | 251/144 X |
| 1,534,139 | 4/1925 | Ostrander | 251/144 X |
| 1,606,912 | 11/1926 | Young | 251/77 |
| 1,899,938 | 3/1933 | Buenger | 251/144 X |
| 2,011,314 | 8/1935 | Folmsbee | 251/144 X |
| 2,139,280 | 12/1938 | McBride | 251/144 X |
| 2,164,039 | 6/1939 | Meyer et al. | 251/144 X |
| 3,981,481 | 9/1976 | Reedy et al. | 251/144 |

FOREIGN PATENT DOCUMENTS

| | | | |
|---|---|---|---|
| 601346 | 8/1934 | Fed. Rep. of Germany | 251/144 |
| 529741 | 9/1921 | France | 251/144 |
| 902541 | 12/1944 | France | 251/144 |

Primary Examiner—William R. Cline
Attorney, Agent, or Firm—Henry W. Cummings

[57] ABSTRACT

A tank vehicle lading valve assembly is provided including a lading valve mounted in an opening in the bottom of the tank which is movable vertically between open and closed positions. A valve housing or outlet chamber including an unloading spout is attached below a tank bottom mounting flange with fasteners, which preferably define a shear plane. A first operator attached to an upper portion of the lading valve extends vertically up through the tank to the upper portion of the tank where it is adapted to receive a suitable handle or tool to move the lading valve between open and closed positions. A second operator is preferably attached to a lower portion of the lading valve. The second operator portion preferably extends at least partially through the valve housing. Thus the lading valve is operable from either the top of the tank or from the bottom of the tank. The first operator may be eliminated and the lading valve operated from the bottom. Preferably in the event of impact to the valve housing, the housing will shear off or drop off along the plane defined by the fasteners extending into the mounting flanges, and the lower second operator portion will shear off or drop off from the second operator, leaving the lading valve in place to substantially prevent escape of lading from the tank.

13 Claims, 9 Drawing Figures

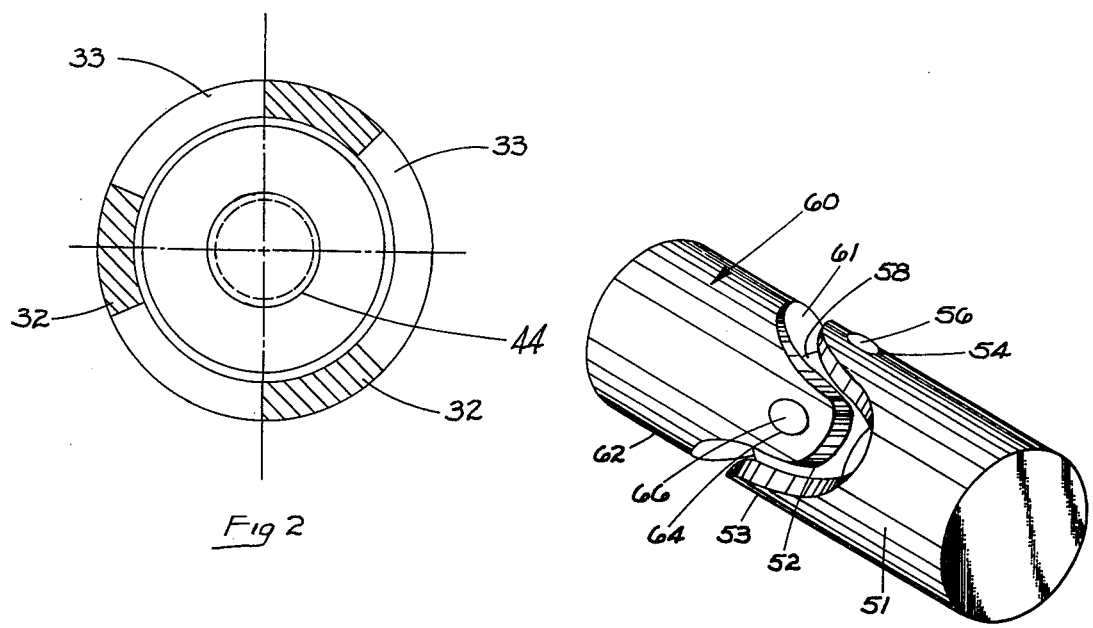
Fig 2
Fig 3
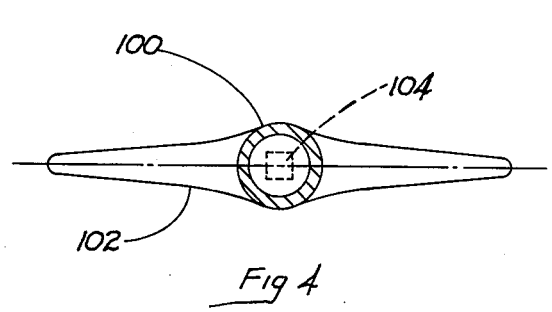
Fig 4
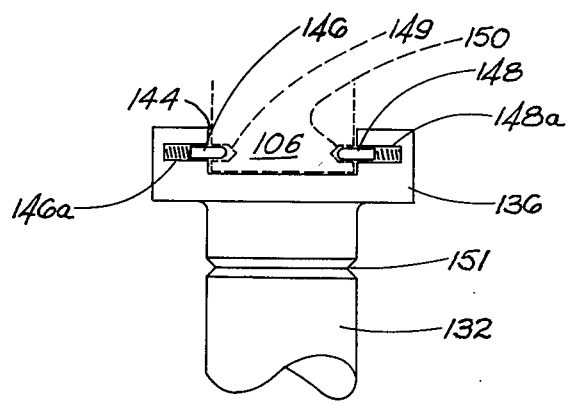
Fig 5

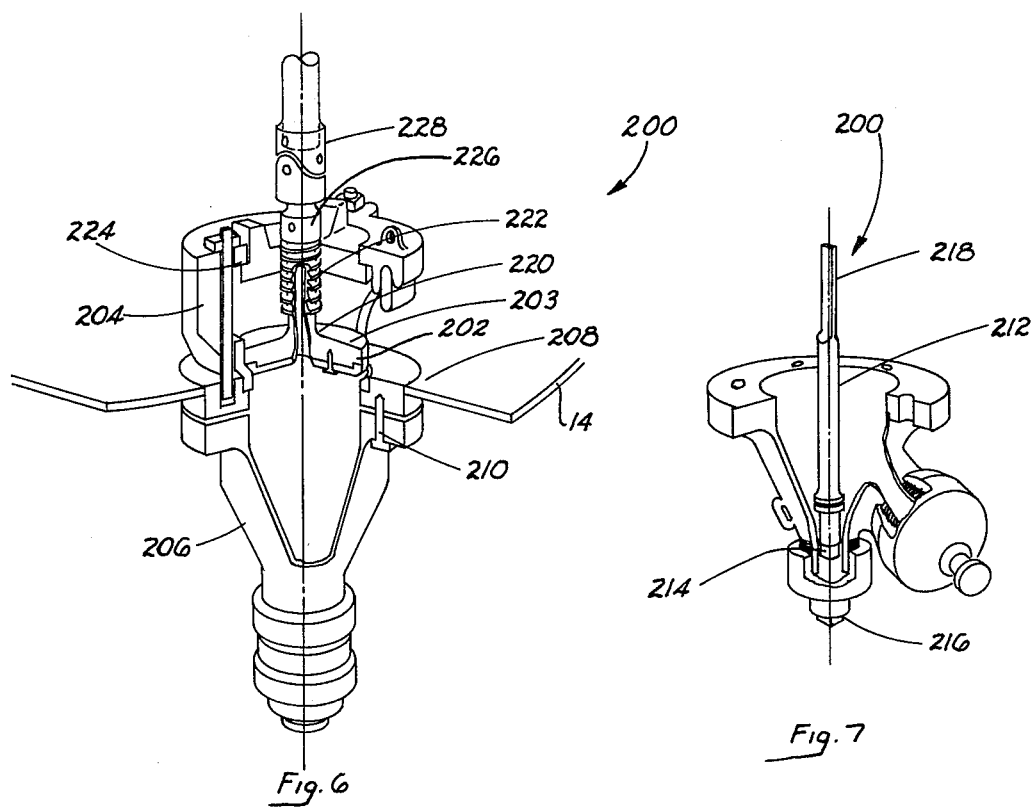

COMBINATION TOP OPERABLE AND BOTTOM OPERABLE TANK LADING VALVE ASSEMBLY

BACKGROUND OF THE INVENTION

In one tank car construction commonly used, a valve cage or guide is located in the bottom of the tank adjacent an opening in the tank bottom. A lading valve is movable vertically relative to the tank bottom opening between open and closed positions. An operating rod for the lading valve extends through the valve cage to the top of the tank. The valve cage guides vertical movement of the operating rod as the lading valve moves between open and closed positions. The operating rod may be provided with a pin and slot arrangement to allow vertical movement of the tank top relative to the tank bottom and allow a small amount of misalignment. The valve cage and the valve operator may be cooperatively threaded whereby the lading valve rotates in moving vertically between open and closed positions. See, for example, U.S. Pat. Nos. 1,605,460 and 1,727,702.

In one bottom operated lading valve construction disclosed in U.S. Pat. No. 3,981,481 (Sept. 21, 1976) a lading valve is movable vertically relative to a valve seat formed on a valve body located in the bottom of the tank. An outlet housing or chamber is attached to a flange portion of the valve body with fasteners which define a shear plane. The housng includes a lower operator extending vertically within the housing which engages an upper operator located within the valve body to move the lading valve between open and closed positions. In the event of hard impact to the housing, for example in a derailment, the housing will shear off along the shear plane defined by the fasteners and the lower operator will shear off or drop off from the upper operator, leaving the lading valve in place to substantially prevent the escape of lading.

In U.S. Pat. No. 3,486,528 (1969), a bottom operated air vent valve operator includes ball and socket joints to allow for misalignment of the vertical operator relative to the tank top valve seat 18. However, this operator is a push-pull type and these ball and socket joints will not transmit torque.

Universal joints which will transmit torque and which allow for longitudinal misalignment are commercially available. For example see Lovejoy Products, Publication No. L1005 (dated Feb. 1977) 2655 Wisconsin Ave., Downers Grove, Ill. 60615.

SUMMARY OF THE INVENTION

An object of the present invention is to provide a lading valve assembly for transportation tanks, particularly railway tank cars, which can be operated from either the top or the bottom of the vehicle, or both.

It is another object of the present invention to provide a lading valve assembly according to the foregoing object in which the mounting flange for the lading valve does not extentd sufficiently far below the bottom of the tank as to require a skid to comply with AAR Regulations. Currently the distance is one (1) inch below the lower surface of the tank bottom.

It is another object of the invention to provide a lading valve assembly which is operable from the top of the vehicle by rotation of a top operator extending downwardly through the tank to the lading valve, including a universal joint which accommodates significant longitudinal misalignment of the top operator relative to the lading valve.

It is another object of the present invention to provide a bottom and/or top operated lading valve which can be installed and maintained from the bottom.

It is another object of the present invention to provide a lading valve having a secondary seal which will seat in the event the primary seal burns, softens or melts.

In accordance with the present invention a tank vehicle lading valve assembly is provided including a lading valve mounted in an opening in the bottom of the tank which is movable vertically between open and closed positions relative to the bottom opening. A valve housing including an unloading spout is attached to a tank bottom mounting flange with fasteners, which preferably define a shear plane. A first operator attached to an upper portion of the lading valve extends vertically up through the tank to the upper portion of the tank where it is adapted to receive a suitable handle or tool to move the lading valve between open and closed positions. Preferably a second operator is attached to a lower portion of the lading valve extending downwardly from the lading valve at least partially through the valve housing. The first operator may be eliminated and only the second used, thus the lading valve is operable from either the top of the tank, from the bottom of the tank, or both.

For railway tank car applications, the mounting flange preferably does not extend sufficiently far below the lower surface of the tank bottom, in excess of one (1) inch, that a skid is required to comply with AAR and DOT Regulations regarding projections extending below the tank bottom.

Preferably in the event of impact to the valve housing, the housing will shear off or drop off along the plane defined by the fasteners extending into the mounting flanges, and the lower second operator will shear off or drop off from the second operator, leaving the lading valve in place to substantially prevent escape of lading from the tank.

The first operator is preferably rotary operated and includes a universal joint to allow for significant misalignment between the lading valve and the first operator.

In one embodiment a combination valve seat and cage is provided which can be assembled outside the tank and installed from the bottom.

Another preferred feature of the present invention is the provision of secondary seal on the lading valve whereby in the event the lading valve seal burns, softens, or melts, the lading valve will move vertically down and the secondary seal will seat, preventing lading from escaping.

THE DRAWINGS

FIG. 2 is a sectional view looking in the direction of the arrows along the line 2—2 in FIG. 1;

FIG. 3 is a perspective view of the universal joint shown in FIG. 1;

FIG. 4 is a sectional view looking in the direction of the arrows along the line 4—4 in FIG. 1;

FIG. 5 is an enlarged elevation, partly in section, of the connection between the lower operating portion and the depending valve operator;

FIG. 6 is a schematic perspective view of another embodiment of the present invention;

FIG. 7 is a schematic perspective view of the lower operator to be used in conjunction with the valve assembly shown in FIG. 6;

DESCRIPTION OF PREFERRED EMBODIMENTS

Figure 1:
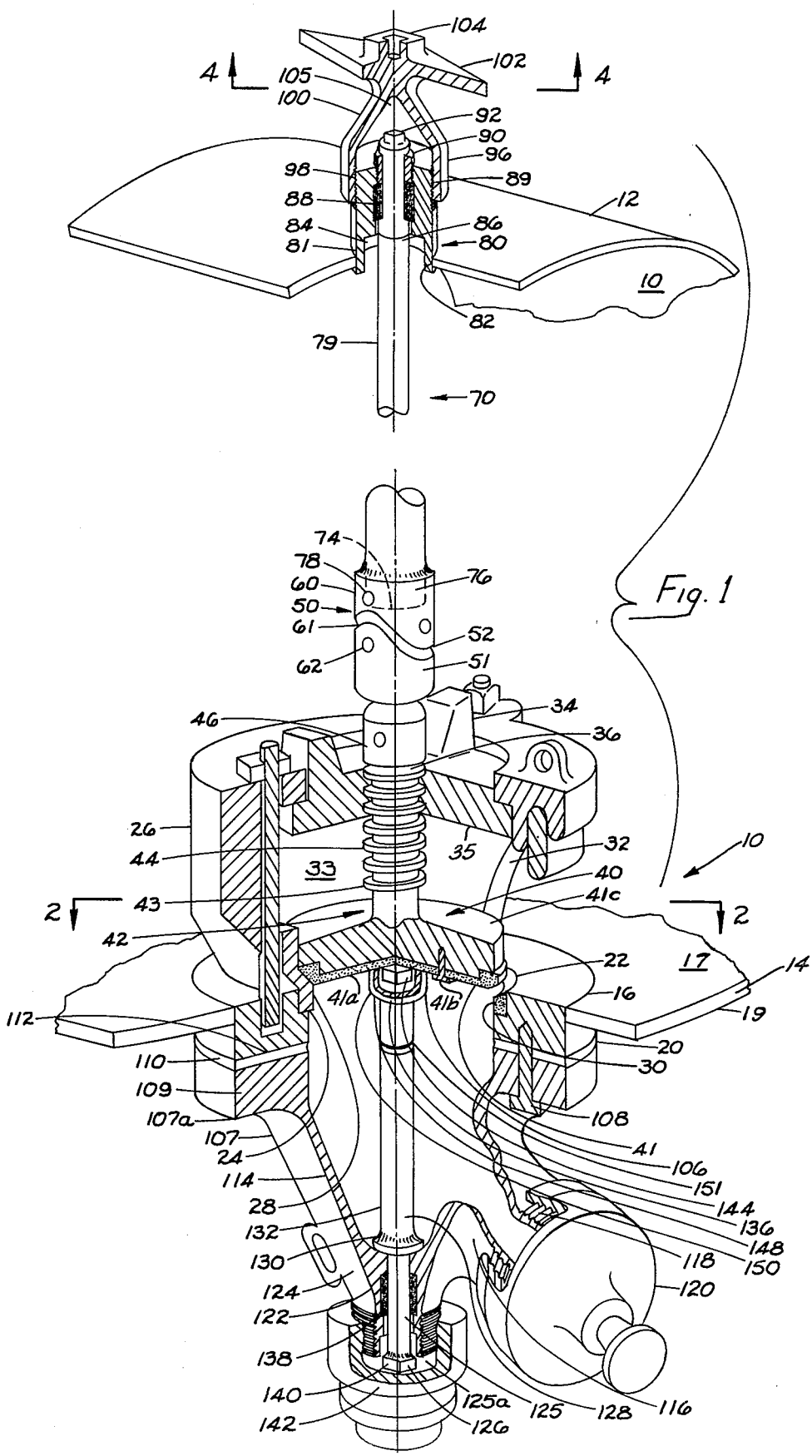
FIG. 1 is a vertical view of a railway tank car with parts broken away illustrating the top and bottom operators of the present invention.

The present invention is applicable to transportation tanks of a variety of types, including over-the-road tank trucks and tank type containers. However it is particularly adapted to railway tank cars and the invention will be described in relation to railway tank car application.

A railway tank car is indicated in the drawings at 10. The tank car includes a tank top 12 and a tank bottom 14. Tank bottom 14 includes an opening 16 into which a mounting flange 20 is attached by welding. An opening 22 is provided in the mounting flange including a machines surface indicated at 24. A supporting seat 30 is defined adjacent surface 24. A valve cage 26 includes a lower circumferential portion 28 resting on seat 30. As shown in FIG. 2 a plurality of vertical ribs 32 are provided between lading slots 33 which support a cage guide portion 34. Guide portion 34 includes a lower surface 35, and is internally threaded at 36.

A valve closure member indicated generally at 40 includes a machined lower surface 41. A seal 41a is held in place with fasteners 41b. Seal 41a is adapted to seat on valve seat 30. Valve closure 40 includes an upper surface 41c. Valve closure member 40 is attached to a first vertically extending operator 42 including a lower rod portion 43 having external threads indicated at 44 adapted to cooperate with threads 36 in cage guide portion 34. Upper operator 42 further includes a stem portion 46 of reduced cross section extending upwardly to engage a universal joint generally indicated at 50.

Universal joint 50 as shown in FIG. 3 includes a lower depending yoke portion 51 welded or otherwise attached to first operator stem portion 46. Universal joint portion 51 includes a slot 52 and a yoke 53 having longitudinally spaced openings 54 therein. A pin 56 joins yoke 53 with a ball 58 located within yoke 53. Universal joint 50 further includes a second or upper yoke portion 60 including a slot 61 and a depending yoke 62 including spaced openings 64. A pin 66 passes through ball portion 58 and through yoke openings 64. Thus upper yoke portion 60 can pivot relative to lower yoke portion 51 and ball 58, fore and aft, about an axis defined by pin 66. Upper yoke portion 60 can pivot laterally about an axis defined by pin 56 by virtue of slot 52. Yoke portion 60 is provided with a slot 74 (FIG. 1) and the lower portion 76 of operating rod 70 is inserted therein and held in place with a pin 78. The universal flange 50 is a commercially available product. For example, see Lovejoy Products Publication No. L1005 dated Feb. 1977, page 49 thereof. (A copy is included in the application file).

The upper portion 79 of operating rod 70 extends to the top of the tank. Thus first operator 42 includes universal joint 50 and operating rod 70 which extends to the top of the tank.

A nozzle or bracket assembly 80 includes a nozzle 81 welded to an opening 82 in the tank top. Nozzle 81 further includes a hollow cylindrical portion 84 and a guide portion of reduced internal diameter at 86 to support the upper end 79 of operating rod 70 and one end of a packing 88. A threaded packing nut 90 holds packing 88 in place. Clearance is provided between guide portion 86, packing 88, and nut 90 to allow relative movement between rod portion 79 and nozzle assembly 80. The upper portion of operating rod 79 includes a tool connection portion 92.

An operating rod cap 96 includes a lower threaded portion 98 engaging a threaded portion 89 on nozzle 80. Cap 96 further includes an upwardly extending portion 100, and an operating handle 102. In the mid-portion of the operating handle, a slotted tool portion 104 is provided of a size to fit over tool connection portion 92. The handle includes a lower surface 105.

Thus to rotate rod 79 to raise or lower valve 40, cap 96 is disconnected from threads 98 and turned over so that the slotted tool 104 engages the tool connection portion 92, and the handle 102 is used to rotate operating rod 70 and the remainder of upper operator 42.

If the tank is impacted and the tank top moves downwardly relative to the tank bottom, the nozzle assembly 80 and cap 96 move downwardly relative to the operating rod 70. After the impact the tank top and bracket assembly assume the original position shown in FIG. 1. Sufficient clearance is provided between the top of connection portion 92 and lower surface 105 to accommodate the movement.

Valve 40 preferably also includes a second operating portion 106 depending therefrom at the center thereof. A valve outlet chamber or housing 107 having a flange portion 107a is attached to mounting flange 20 with fasteners 108. Fasteners 108 by virtue of their cross section or by virtue of grooves 110 define a shear plane 112 at the juncture of mounting flange 20 and housing flange 107a. Housing 107 further includes a depending body portion 114 and at least one spout 116 integrally formed therewith. Spout 116 is preferably threaded at 118 to receive a suitable cap 120.

A housing mounting portion 122 is located below body portion 114. A lower second operator 124 is mounted within mounting portion 122. Operator 124 includes an operating rod 125 having a lower tool connection portion 126. Operating rod 125 includes a plate portion or annular extension 128 which seats on a shoulder 130 of mounting portion 122. Operating rod 125 further includes an upward extension 132 having a tool connection portion 136 for valve closure 40. A packing 138 is held in place with a threaded nut 125a. A removable cap 142 is threaded onto body portion 114 in the lower operator assembly.

As shown in FIG. 5, operator portion 106 fits within an opening 144 in second operator connection portion 136. A pair of pins 146 and 148 are biased into open position by springs 146a and 148a in second operating upper connection portion 136. Pins 146 and 148 pass through openings 149 and 150 provided in second operator portion 106. When second operating portion 136 engages depending portion 106, pins 146 and 148 snap into place. A shear groove 151 is provided in upward extension 132. Upon impact to housing 107 of sufficient force to shear fasteners 108, second operating portion 132 will also shear along groove 151.

It is to be understood that upper operator 42 can be eliminated and only second operator portion 106 utilized.

The housing 107 is described in greater detail in U.S. Pat. No. 3,981,481 granted Sept. 21, 1976; U.S. Pat. No.

4,124,193 granted 11/7/78; U.S. Pat. No. 4,141,535 granted 2/27/79 and U.S. Pat. No. 4,158,453 granted 6/19/79. These patents are hereby incorporated into the present application by this reference.

The operation of the apparatus is as follows. If it is desired to open the valve from the top of the tank, cap 120 is first removed from spout 116 and unloading hose or conduit attached thereto. Cap 96 is removed from the threaded fitting 98 and turned over. Connection portion 104 of the cap is attached to connection portion 92 on the operating rod and the operatind rod is rotated. Torque applied to the first operator 42 is transferred through the operating rod 70 and the universal joint 50 to operating portion 46. Threads 44 and 36 engage to guide vertical movement of valve member 40 away from seat 30 to the open position. It should be noted that operation of the valve 40 from the top will also cause rotation and vertical movement of second operator 106 and lower operating rod 125. The portion 125a of operating rod 125 located between connection portion 126 and packing 138 should be of sufficient length to allow upward movement of operating rod 125 to the full open position with valve surface 41c in engagement with cage lower surface 35.

The lading will then flow out through the hose or conduit attached to threads 118 of spout 116. Rotation of operating rod 70 in the opposite direction will move valve 40 downwardly to assume the closed and seated position with seal 41a engaging valve seat 30, and lower connection portion 126 extending below mounting portion 122.

Universal joint 50 is provided in the first operator between the first valve operator portion 46 and the top operating rod 70 to allow for misalignment which may occur between the operating rod and/or upper nozzle assembly 80 and the valve cage 26 and valve seat 30, during assembly, or for misalignment which may occur after installation, for example, due to impact, to a portion of the operating assembly after installation.

If it is desired to unload the lading from the bottom, or when only bottom operator 106 is present, cap 142 and cap 120 are removed from lower housing 107. Upper cap 96 need not be removed. A suitable tool is attached to lower second operator connection portion 126 and operating rod 125 is rotated. This in turn rotates second operator 106 and moves the valve 40 from the closed, seated position vertically to an open position. It will be noted that this causes vertical movement of operating rod 70 and rotation of first operating portion 42.

Sufficient clearance is provided between the top of connection portion 92 and the lower surface 105 of handle 102 to enable valve 40 to assume the full open position with upper valve surface 41c in engagement with lower surface 35 of cage portion 34.

It is preferred that mounting flange 20 extend flush with the inner surface 17 of the tank bottom or extend to some extent within the tank, such that mounting flange 20 may be structurally sound above fasteners 108, and at the same time the distance between the lower surface 19 and bottom of the mounting flange not exceed one (1) inch. If mounting flange 20 is so dimensioned a skid is not required in order to comply with new AAR and DOT Regulations for tank car projections extending below the bottom of the tank.

In this regard it may be desirable to utilize a mounting flange constructed according to one or more of the embodiments of U.S. Pat. No. 4,198,032.

Alternatively, a combination skid and valve body may be utilized constructed generally according to the teachings of U.S. Pat. No. 4,184,663. Each of these applications is hereby incorporated into the present application by this reference.

In either event if the housing 107 is seriously impacted the housing will drop or shear off along the shear plane 112 defined by fasteners 110 and shear groove 151. Second operating rod 125 will drop off below groove 151 from second operator 106. Thus the valve 40 will remain in the closed, seated position and will substantially prevent lading from escaping from the tank in the event of such impact.

It is therefore seen that the present invention provides a lading valve assembly which is operable from the top of the tank, from the bottom of the tank, or from both. According to the preferred embodiment, the mounting flange does not extend sufficiently below the tank bottom to require a skid. The invention further provides that the lower housing 107 and lower operating rod 125 will shear off and/or drop off in the event of impact thereto, resulting in the valve 40 remaining in the closed, seated position, substantially preventing the removal of lading from the tank in the event of such impact. Misalignment in the first operator between the valve and/or the valve cage and operating portion 79 located at the top of the tank is taken up in universal joint 50.

Another embodiment of the present invention is shown in FIGS. 6 and 7. In this embodiment indicated generally at 200 a lading valve 202 is vertically movable within a valve guide 204 as described above. A depending housing 206 is attached to flange 208 with fasteners 210. Lower operator 212 includes a connection portion 214. A cap 216 protects connection portion 214. The upper portion 218 of operator 212 has a rectangular cross section (FIG. 7), and engages rectangular slot 220 provided in valve 202. Slot 220 extends upwardly at 222 above the upper surface 203 of valve 202.

It will be apparent that rotation of operator 212 with portion 218 located within slot 220 will cause vertical movement of the valve 202 between open and closed positions. A stop 224 may be provided to cease vertical movement when the valve 202 assumes the full open position.

If desired, an upper operator 226 constructed as described above, optionally including a universal joint 228, may also be provided.

Figure 8:
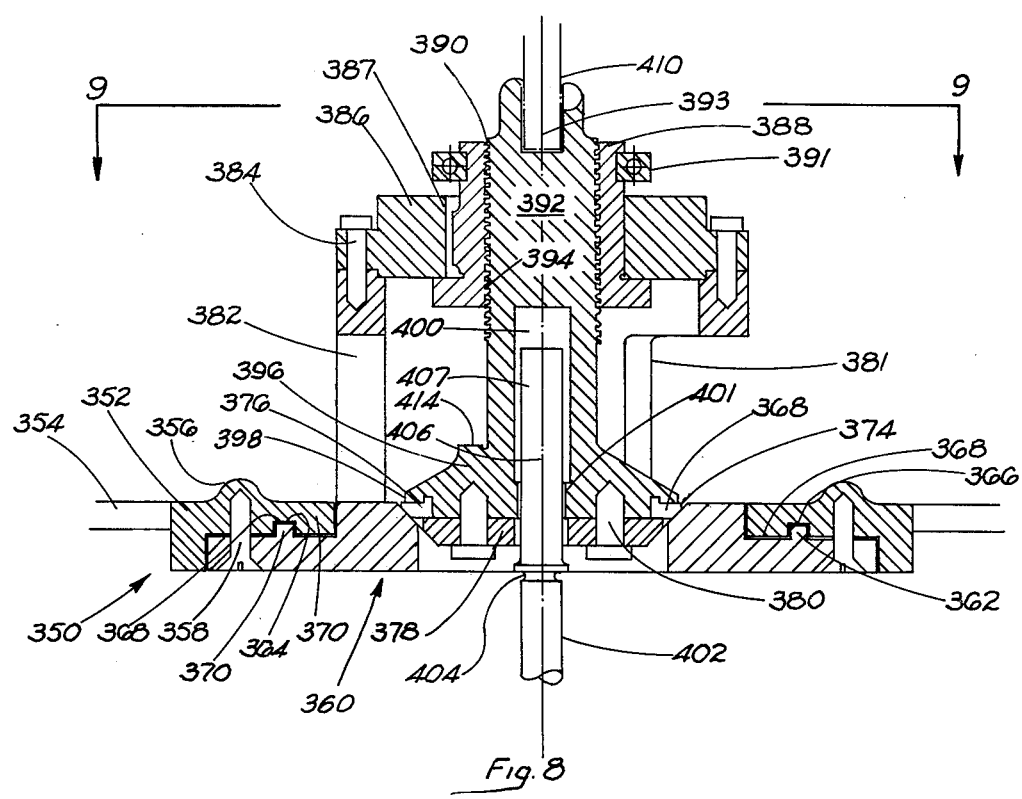
FIG. 8 is a sectional view of another embodiment of the present invention.
Figure 9:
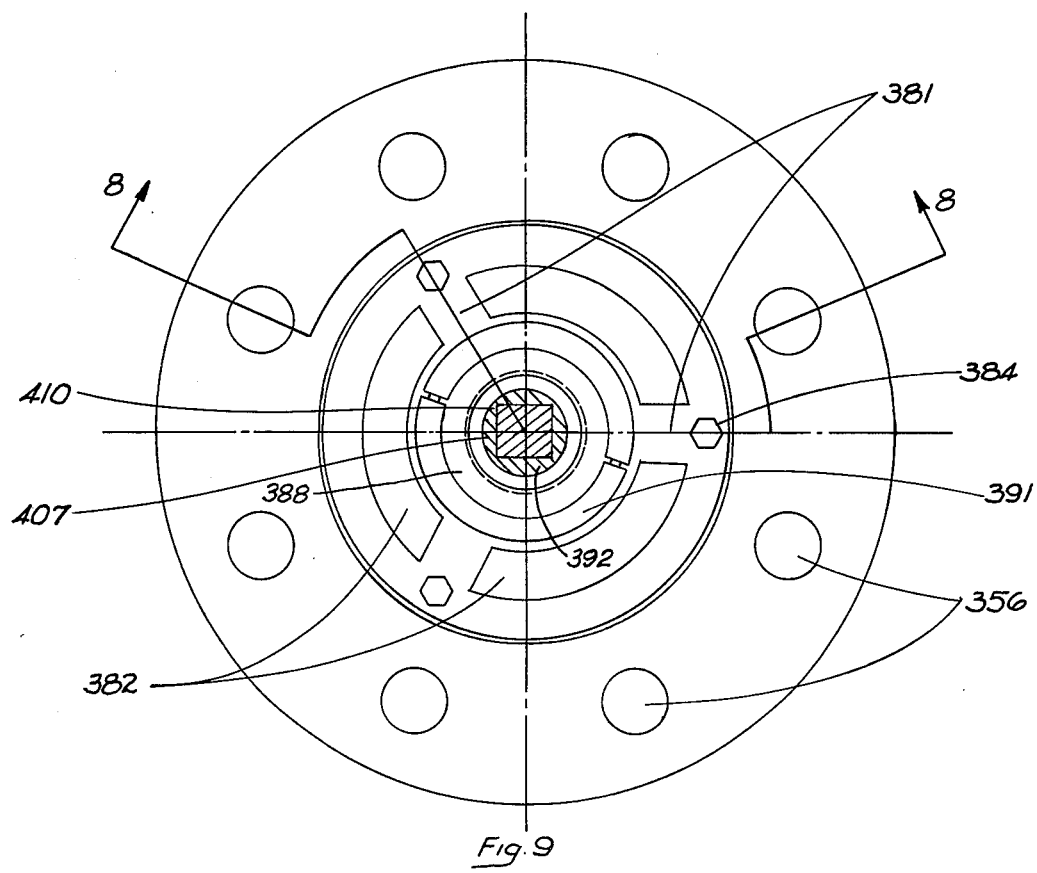
FIG. 9 is a sectional view looking in the direction of the arrows along the line 9—9 in FIG. 8.

Still another embodiment of the present invention is shown in FIGS. 8 and 9. In this embodiment, indicated generally at 350, a tank car flange 352 is welded to the tank bottom 354. Flange 352 includes reinforcing knobs 356 to provide sufficient material for countersunk fasteners 358 to hold in place a combination valve seat and valve cage 360. Combination valve seat and cage includes an annular projection or rib 362 which fits within locating slot 364 in flange 352. A suitable seal or gasket 368 is positioned between flange 352 and cage 360.

An inclined valve seat 374 is provided on cage 360 which is engaged by a seal 376 held in place by a retainer 378 and fasteners 380. Vertically extending legs 381 are located between openings 382 in the valve cage. The legs are circumferentially spaced about valve seat 374.

Fasteners 384 hold in place a keeper 385 having inwardly extending projections 386 and slots 387. Keeper 385 engages with clearance 388 an operator guide 389 which is internally threaded as indicated at 390. A split collar is provided at 391 including removable connector elements 391a, spaced from the upper surface of keeper 386. A vertically extending operating shaft 392 is externally threaded as indicated at 394 and includes a depending valve body 396 having a groove 398 in which seal 376 is inserted.

In addition, operator 392 includes a vertical slot 400 having a rectangular cross section at 401 into which is inserted a lower operator 402 having a shear groove 404 and an upper extension 406 having a rectangular cross section portion 407. Rotation of operator 402 with engagement of rectangular slot portion 401 will raise and lower valve body 396. Valve body 396 also can be raised and lowered by an upper operator 410 inserted into non-round slot 393.

Combination cage and valve seat 360 can be bench assembled in the manner shown in FIGS. 8 and 9, and then inserted from the bottom by attaching fasteners 358. It may be necessary for the operator to be inside the tank to insert upper operator 410 into slot 393.

Operator 410 can be removed from the top of the tank by lifting vertically. It will be apparent that operator 402 can be removed from the bottom in the same manner as the embodiment shown in FIG. 7. Fasteners 358 may be removed in which case combination valve seat and valve cage 360 can be removed. Fasteners 380 can be removed which removes retainer 378 and seal 376. When combination valve seat and valve cage 360 is removed from the tank proper, fasteners 384 may be removed to disassemble keeper 386 and operator 392.

When combination valve seat and cage 360 is installed, in the event of seal damage through fire, etc., guide 388 and valve body 396 will drop down, by virtue of clearance 387, allowing valve body 396 to seat on seat 374 preventing lading escape.

Stops 414 are provided on valve body 396 to limit valve opening after the valve has assumed the full open position.

Operator 402 has a telescoping shaft, enabling upper operator 410 and shaft 392 to be disconnected from the bottom rather than from the inside of the tank as is presently required.

What is claimed is:

1. A tank lading valve assembly comprising: a valve seat located in an opening in the bottom of the tank; a mounting flange located in said opening and outwardly from said valve seat; said valve seat including a lading opening for entry of lading into the tank and/or exit of lading from said tank; a lading valve located within the tank inwardly of said seat and being movable vertically between open and closed positions relative to said seat; a valve housing including a housing flange portion located below said mounting flange; fastening means connecting said housing flange portion to said mounting flange; said housing including an unloading spout; a first operator attached to an upper portion of said lading valve extending vertically up through the tank to the upper portion of the tank; said first operator adapted to receive a suitable handle or tool to move the lading valve vertically from a closed seated position engaging said valve seat to an open position providing fluid communication between the interior of said tank and said housing; a second operator engaging a lower portion of said lading valve; said second operator including a lower operator extending at least partially through the valve housing and adapted to receive a suitable handle or tool to move the lading valve vertically between open and closed positions, whereby said lading valve may be operated from either the top or the bottom of said tank and whereby in open position lading may flow between said tank, said housing and said unloading spout.

2. A tank lading valve assembly comprising: a valve seat located in an opening in the bottom of the tank; a mounting flange located in said opening and outwardly from said valve seat; said valve seat including a lading opening for entry of lading into the tank and/or exit of lading from said tank; a lading valve located within the tank inwardly of said seat and being movable vertically between open and closed positions relative to said valve seat; a valve housing including a housing flange located below said mounting flange; fastening means connecting said housing flange to said mounting flange; said housing including an unloading spout; a first operator attached to an upper portion of said lading valve extending vertically up through the tank to the upper portion of the tank; said first operator adapted to receive a suitable handle or tool to move the lading valve vertically from a closed, seated position engaging said valve seat to an open position providing fluid communication between the interior of said tank and said housing; said lading valve further comprising means located in the lower portion of said valve for receiving and/or engaging a second operator adapted to extend at least partially through the valve housing and adapted to receive a suitable handle or tool to move the lading valve vertically between open and closed positions, whereby said lading valve may be operated from either the top or the bottom of said tank and whereby in open position lading may flow between said tank, said housing and said unloading spout.

3. A railway tank car lading valve assembly comprising: a valve seat located in an opening in the bottom of the tank; a mounting flange located in said opening and outwardly from said valve seat; said valve seat including a lading opening; a valve housing including a housing flange portion located below said mounting flange, and an unloading spout; a lading valve located within said tank and inwardly of said valve seat movable vertically from a closed, seated position engaging said valve seat to an open position to provide fluid communication between the interior of said tank, said housing and said spout; a first operator attached to an upper portion of said lading valve extending vertically up through the tank to the upper portion of the tank; said first operator adapted to receive a suitable handle or tool to move the lading valve vertically between open and closed positions; a second operator engaging a lower portion of said lading valve; said second operator including a lower operator extending at least partially through the valve housing whereby said lading valve may be moved vertically between said open and closed positions from either the top or the bottom of said tank; said valve housing being maintained in place below said mounting flange with fastening means defining a shear plane between said housing flange and said mounting flange, whereby upon hard impact to said housing, said housing will shear off or drop off along said shear plane; said lower operator having separating means therein whereby at least the lower portion of said second operator will shear off and/or drop off by virtue of said separating means in the event said housing shears off along said plane, thereby leaving said lading valve in closed and seated position to substantially prevent escape of lading from the tank after such impact.

4. A lading valve assembly according to claim 3 wherein guide means are mounted within said tank to guide vertical movement of said lading valve between open and closed positions.

5. A lading valve assembly according to claim 4 wherein said guide means includes a cage having a valve guide portion which engages said lading valve.

6. A lading valve assembly according to claim 5 wherein said cage comprises a combination cage and lading valve seat.

7. A railway tank lading valve assembly comprising: a valve seat located in an opening in the bottom of the tank; a mounting flange located in said opening and outwardly from said valve seat; said valve seat including a lading opening for entry of the lading into said tank and/or exit of lading from said tank; a valve housing including a flange portion located below said mounting flange and an unloading spout; a lading valve located within said tank and inwardly from said valve seat movable vertically from a closed, seated position engaging said valve seat, to an open position to provide fluid communication between the interior of said tank, said housing and said spout; a first operator attached to an upper portion of said lading valve extending vertically up through the tank to the upper portion of the tank; said first operator adapted to receive a suitable handle or tool to move the lading valve vertically between open and closed position; a second operator engaging a lower portion of said lading valve; said second operator including a lower operator extending at least partially through the valve housing whereby said lading valve may be moved vertically between said closed and open positions from either the top or the bottom of said tank; said mounting flange extending below the lower surface of said tank an amount not exceeding one (1) inch whereby a skid is not required to comply with AAR regulations regarding projections extending below the lower surface of the tank bottom; said valve housing being maintained in place below said mounting flange with fasteners extending into said mounting flange which define a shear plane between said housing flange and said mounting flange, whereby said housing will shear off or drop off along said shear plane; said lower operator having separating means therein whereby at least the lower portion of said second operator will shear off and/or drop off by virtue of said separating means in the event said housing shears off along said plane, thereby leaving said lading valve in closed and seated position to substantially prevent escape of lading from the tank after such impact.

8. A lading valve assembly according to claim 7 wherein a cage having a guide portion is mounted within said tank to guide vertical movement of said lading valve between open and closed positions.

9. A lading valve assembly according to claim 8 wherein said first operator rotates and is externally threaded, and wherein said cage guide portion is internally threaded and engages the threads on said first operator.

10. A tank lading valve assembly according to claim 9 wherein said first operator is rotary operated and includes a universal joint to allow for significant misalignment between the lading valve and the first operator.

11. A lading valve assembly according to claim 7 wherein said lower operator extension is pinned to a depending second operator connection portion.

12. A lading valve assembly according to claim 11 wherein said lower operator is provided with a shear groove which will cause said second operator to shear off upon hard impact to said valve housing.

13. A lading valve assembly according to claim 12 wherein said second operator shear groove is aligned with said shear plane.

* * * * *

UNITED STATES PATENT AND TRADEMARK OFFICE
CERTIFICATE OF CORRECTION

PATENT NO. : 4,313,591

DATED : February 2, 1982

INVENTOR(S) : Richard J. Wempe and Gunter R. Behle

It is certified that error appears in the above-identified patent and that said Letters Patent are hereby corrected as shown below:

In column 3, line 23, please change "machines" to --machined--.
In column 10, line 29, please delete --extension--.

Signed and Sealed this

Twenty-second Day of June 1982

[SEAL]

Attest:

Attesting Officer

GERALD J. MOSSINGHOFF

Commissioner of Patents and Trademarks